United States Patent
Sherman, II

[11] Patent Number: 5,881,847
[45] Date of Patent: Mar. 16, 1999

[54] ROTARY TOGGLE MECHANISM FOR ACTUATING A PARKING BRAKE

[76] Inventor: William E. Sherman, II, 3110 Sugar Maple La., South Bend, Ind. 46628

[21] Appl. No.: 811,314

[22] Filed: Mar. 4, 1997

[51] Int. Cl.$^6$ .................................................. F16D 55/26
[52] U.S. Cl. ....................... 188/72.6; 188/72.7; 188/72.9
[58] Field of Search ................................ 188/72.6, 72.7, 188/72.1, 72.2, 72.4, 72.9

[56] References Cited

U.S. PATENT DOCUMENTS

| | | | |
|---|---|---|---|
| 3,701,400 | 10/1972 | Burnett et al. | |
| 3,805,924 | 4/1974 | Gambardella | 188/72.6 |
| 4,006,802 | 2/1977 | Evans . | |
| 4,063,621 | 12/1977 | Heibel | 188/72.6 |
| 4,544,045 | 10/1985 | Runkle . | |
| 4,635,761 | 1/1987 | Smith et al. | 188/72.6 |

FOREIGN PATENT DOCUMENTS 169133  7/1989  Japan .................... 188/72.7

Primary Examiner—Robert J. Oberleitner
Assistant Examiner—Pamela J. Lipka
Attorney, Agent, or Firm—Leo H McCormick, Jr.; Warren Comstock

[57] ABSTRACT

A mechanical actuator (40) for a disc brake assembly (10) to effect a parking brake application. The mechanical actuator (40) includes a housing (62) for retaining an end plate (56) which is rotationally retained in a bore (60) and connected to an end plate (48) which is axially retained in the bore (60). End plate (56) is connected to end plate (48) by a plurality of pivotal connecting rods (50,52,54). The connecting rods (50,52,54) each have an end retained in indentations (74, 76,78) in end plate (56) and indentations (75,77,79) in end plate (48). An input applied by lever (46) causes end plate (48) to rotate about an axis (70) of bore (60) and connecting rods (50,52,54) to pivot about indentations (74,76,78) and since end plate (56) is rotationally restrained the force from connecting rods (50, 52,54) is translated into an axial force component which moves end plate (56). The force component varies as a function of angle of rotation of end plate (48). Initial rotation causes a large displacement of end plate (56) but as the connecting rods (50,52,54) approach planes which are parallel to the axis (70) of bore (60), a smaller displacement occurs however with smaller displacement more of the input force from the input lever (46) is transmitted to end plate (56). The three connecting rods (50,52, 54) form a plane through which substantially equal forces are transmitted into end plate (56) to mechanically move friction pads (28,30) into engagement with rotor (12) and effect a desired clamping force to retain the rotor (12) in a fixed position with respect to the vehicle.

7 Claims, 2 Drawing Sheets

ROTARY TOGGLE MECHANISM FOR ACTUATING A PARKING BRAKE

This invention relates to a toggle mechanism through which a rotary input is translated into an axial input for actuating a parking brake in a service disc brake assembly.

BACKGROUND OF THE INVENTION

When disc brakes are used on the rear wheels of a vehicle, it is necessary to provide a mechanical actuator to institute an emergency and parking brake function of the disc brake assembly. U.S. Pat. No. 3,701,400 illustrates a common used parking brake actuator wherein a ball and ramp mechanism respond to a mechanical input to actuate the rear disc brakes associated with the rear wheels. Adjustments for wear of a friction pad to maintain the functional operation of the parking brake is illustrated in U.S. Pat. No. 3,805,924. This type of actuator functions in an adequate manner, however, after an extended period of use wear may occur and as a result the balls do not uniformly engage the ramps such that unequal loading may occur. With unequal loading a larger input force is required to activate the parking brake.

In an effort to overcome unequal loading forces, a toggle actuator, as disclosed in U.S. Pat. No. 4,544,045, was developed to provide the mechanical force required to activate a parking actuation function for a rear disc brake. In this brake system, an input force is applied through reaction and actuation toggles located in series axial alignment with an actuation piston. This axial force is applied to the actuation piston to move a friction member into engagement with a rotor connected with a wheel of a vehicle and effect the parking brake function. This type of parking brake actuator functions in an adequate manner for most applications, however, under certain conditions with this type parking brake actuator adequate force through the single input may not be large enough to move the friction member into engagement with the rotor through the operation of a service brake. In order to actuate the parking brake it is necessary to apply the parking brake before the release of the service brake which has already positioned the friction pads against the rotor to achieve a desired braking retention force. This type of actuation while functionally operational acceptable does require additional effort on the part of an operator and as a result a better method of actuation of a parking brake through a single and independent operation would be more accepted to a vehicle operator.

SUMMARY OF THE INVENTION

A primary object of the present invention is to provide a parking brake with an actuation mechanism which is rotated by an actuation member to provide an axial mechanical input for moving a piston into engagement with a rotor of a disc brake with sufficient force to independently develop a clamping force between the rotor and a friction member and retain a rotor associated with the wheel of a vehicle stationary and especially when the vehicle is positioned on a inclined plane. The toggle actuation assembly is characterized by linkage means including first, second and third cylindrical rods which connect a first plate which is keyed in a bore of a housing and connected to a piston of a service brake with a second plate which is axially retained in the bore and connected to an input member. Each of the rods have first and second ends which are located in corresponding indentations in the first and second plates. In a rest position, a force applied to the first plate is transmitted through the first, second and third rods to rotate the second plate to a rest position. With the second plate in the rest position, the first, second and third rods are located in corresponding first, second and third planes which form a non perpendicular angle with respect to the first plate. In response to a force applied to the input member, the second plate is rotated from the rest position such that the first, second and third rods pivot with respect to the first plate and are moved to parallel planes with respect to the axis of the first plate. As the first, second and third rods move toward the parallel planes, equal forces are applied through the first, second and third rods to uniformly move the first plate and provide the force to axially move the piston of the service brake which in turn moves a friction member into engagement with the rotor to achieve a desired clamping force to retain the rotor in a fixed position.

An advantage of this invention provides over current mechanical actuation devices for a parking brake occurs through the transmission of an actuation force through the rotation of an end plate causing first, second and third rods to pivot on a force transmission plate and move to parallel planes with the axis of the force transmission plate to uniformly apply an axial input force corresponding to the actuation force to the transmission plate.

A further advantage of this invention results in the ability to provide an actuation force resulting from a mechanical advantage achieved through the uniform transmission of an input force through three force carrying rods by the rotation of an end plate and the axial translation of such input force into an axial force applied to a force transmission plate.

DETAILED DESCRIPTION

Figure 1:
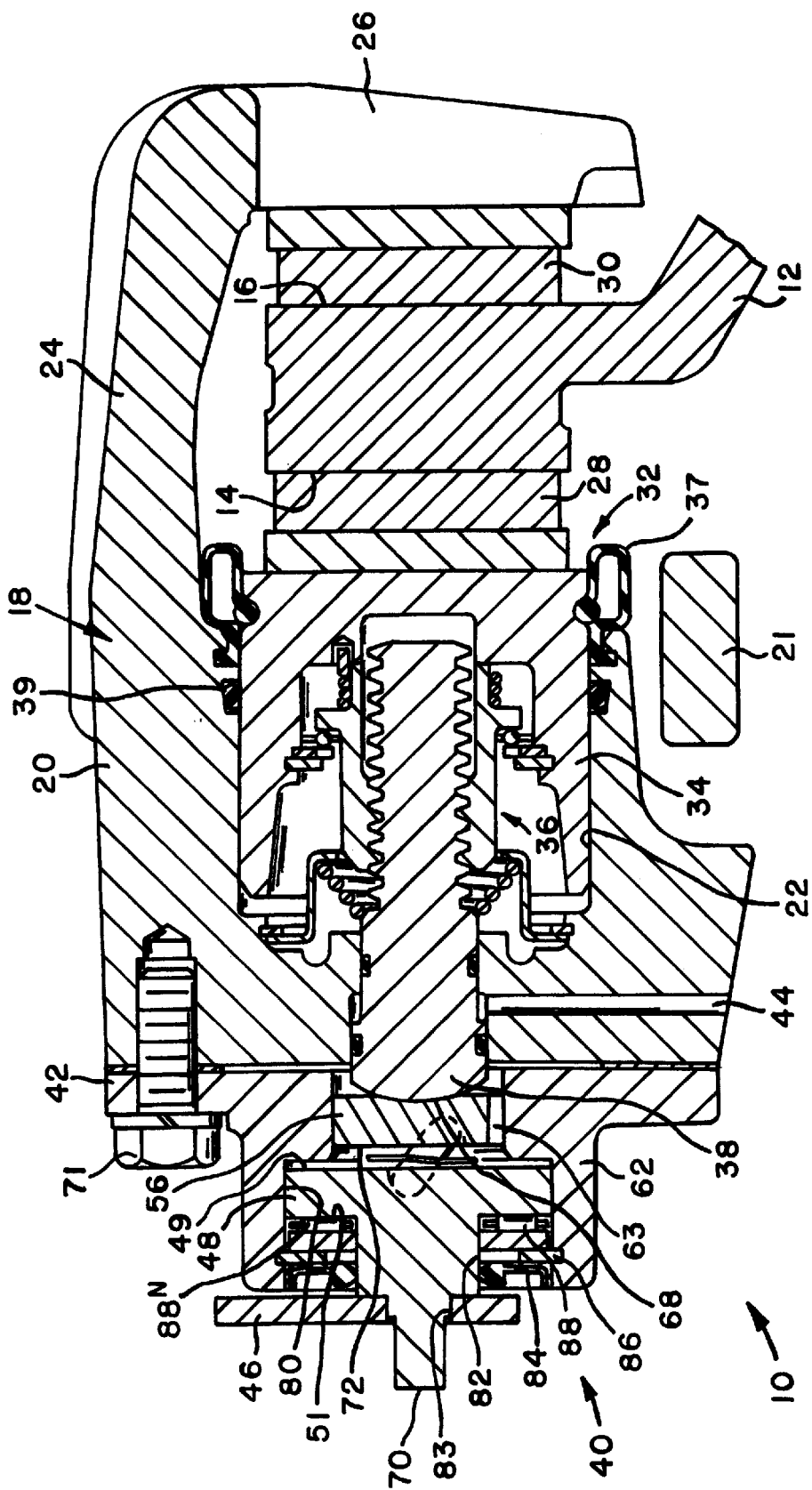
FIG. 1 is a sectional view of a disc brake assembly with a mechanical actuation member made according to the principals of the invention for initiating a parking function.
Figure 2:
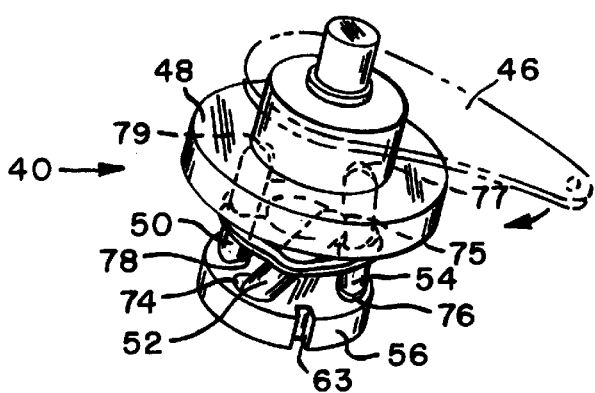
FIGS. 2 is a prospective view of the actuator member of FIG. 1.
Figure 4:
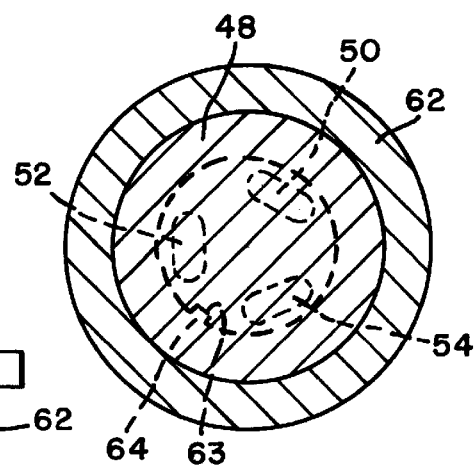
FIG. 4 is a sectional view taken along lines 4—4 of FIG. 3.

The disc brake assembly 10 illustrated in FIG. 1, includes a rotor 12 mounted for rotation on a vehicle and includes a pair of opposing friction faces 14 and 16 which are clamped together by a caliper member 18 to effect a brake application. The caliper member 18 is slidably mounted on a fixed torque member 21 attached to the vehicle and includes a housing 20 which extends in a plane that is generally parallel to friction face 14 and has a bore 22 therein, a bridge portion 24 which extends over the periphery of rotor 12 and a radial inwardly extending reaction leg or portion 26 which is parallel with friction face 16. The bore 22 receives a piston assembly 32 which is connected to friction pad 28 associated with friction face 14 while the reaction leg 26 connected to friction pad 30 associated with friction face 16.

Piston assembly 32 includes a first piston 34, an adjuster assembly 36 and a second piston 38. Piston 34 is slidably mounted in bore 22 for movement toward and away from rotor 12 along an axis which is generally parallel to the axis of rotation of rotor 12. Adjuster assembly 36 is designed to compensation for wear of friction pads 28,30 to maintain a predetermined running clearance between rotor 12 and the friction pads 28,30. The second piston 38 cooperates with bridge portion 20 to transmit force to the leg portion 26 to effect a desired parking brake function. A cover 42 is attached to housing 20 to close the end of bore 22 remote from rotor 12. Pressurized fluid is admitted into bore 22 through inlet port 44 for moving piston 34 toward rotor 12. After a brake application, piston 34 is yieldably urged away from rotor 12 by a seal 39 which prevents fluid from escaping from bore 22. A boot 37 is attached to housing 20 to prevent contamination from entering bore 22.

A mechanical actuator 40 as best shown in FIGS. 2, 3, 4 and 5, is connected to the second piston 38 to initiate an emergency or parking brake function for the disc brake assembly 10. The mechanical actuator 40 includes a lever 46, a first or axially movable end plate 56, a plurality of toggle or connecting rod members 50,52,54, and a second or rotational end plate 48 through which an input force is applied to mechanically engage friction pads 28,30 with rotor 12 to effect a parking brake function.

In more particular detail, mechanical actuator 40 has a housing 62 which is fixed to housing 20 (housing 62 is shown as a separate member but could be cast as part of housing 20) and by a plurality of bolts 71 to align a stepped bore 60 in the housing 62 with bore 22 of housing 20. End plate 56 has a series of axial slots 63 which are mated with a corresponding plurality of splines 64 on housing 62 to prevent end plate 56 from rotating within housing 62. End plate 56 has a first face 66 and a second face 72. The first face 66 has a spherical surface 68 thereon for receiving the end of piston 38. The apex of spherical surface 68 is located in the axial plane of bore 60. The second face 72 has a plurality of indentations 74,76,78 thereon which are equally spaced in a radial plane a fixed distance from axial plane 70 of bore 60. Indentations 74,76,78 each have a shape in the form of a truncated cone with spherical ends for receiving a first spherical end on each of the toggle or rod connecting members 50,52,54 while a second spherical end on each of the toggle or connecting rod members 50,52,54 is received in similar indentations 75,77,79 located on face 49 of end plate 48. A cage 55 is located approximately at the mid point of the rod connecting members 50,52,54 to aid in the assembly within bore 60 but by being located at the mid point do not effect pivotal movement about indentations 74,76,78 in end plate 56.

End plate 48 has a cylindrical body with a first diameter surface 80 which is located in stepped bore 60 of housing 62, a second diameter surface 82 which engages seal 84 of bearing retention ring 86 and a third diameter surface 83 to which lever 46 is fixed. The bearing retention ring 86 has a plurality of needle bearings 88,88'. . . 88n with clearance with bore 60 such that an input applied to lever 46 may rotate plate 48 on the needle bearings 88,88'. . . 88n without excessive resistance.

MODE OF OPERATION OF THE INVENTION

The disc brake assembly 10 functions as a service brake in response to pressurized fluid being supplied through inlet port 44 to bore 22. The pressurized fluid acts on piston 34 to urge pad 28 into engagement with rotor 12 and define friction face 14 while piston 38 acts through bridge 24 to pull leg 26 and pad 30 toward rotor 12 to define friction face 16. The coefficient of friction developed by the friction faces 14 and 16 resulting from the intensity of the pressure of the hydraulic fluid supplied through inlet port 44 produces a brake application as desired by an operator. On termination of the supply of pressurized fluid to inlet port 44, seal 37 allows the pistons 34,38 to return to a desired running clearance with rotor 12.

When an operator desires to effect a parking brake or emergency brake function a mechanical input is applied to lever 46. The input force as applied to lever 46 causes plate 48 to rotate with respect to bore 60. Rotation of plate 48 in turn causes rods or toggles 20 50,52,54 to respectively pivot about indentations 74,76,78 on end plate 56 and rotate to a position where rods or toggles 50,52,54 are positioned in planes which are substantially parallel with the axis 70 of bore 60, see FIG. 5. In this position, indentation pairs 74,75; 76,77 and 78,79 are aligned in parallel planes such that force from plate 48 is totally directed into end plate 56 in such a manner that each connecting rod 50,52,54 carry an equal load.

Figure 3:
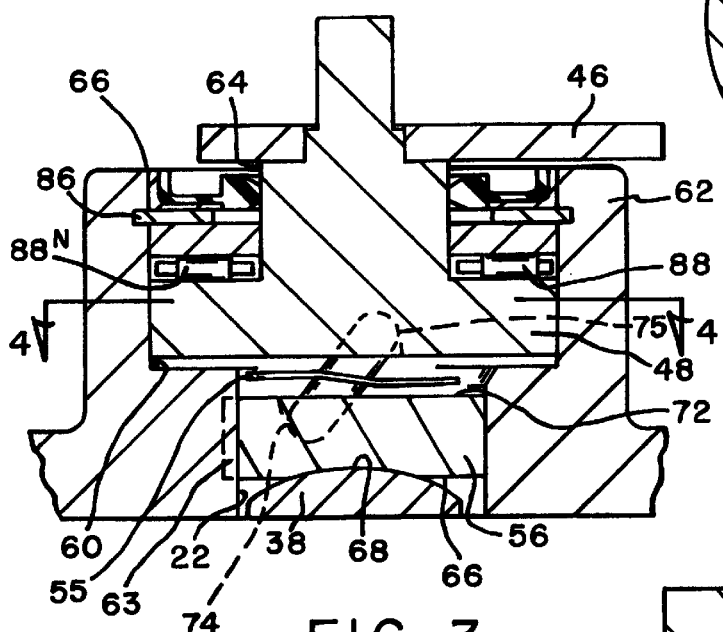
FIG. 3 is an enlarged sectional view of the actuation member of FIG. 1 in a rest position.
Figure 5:
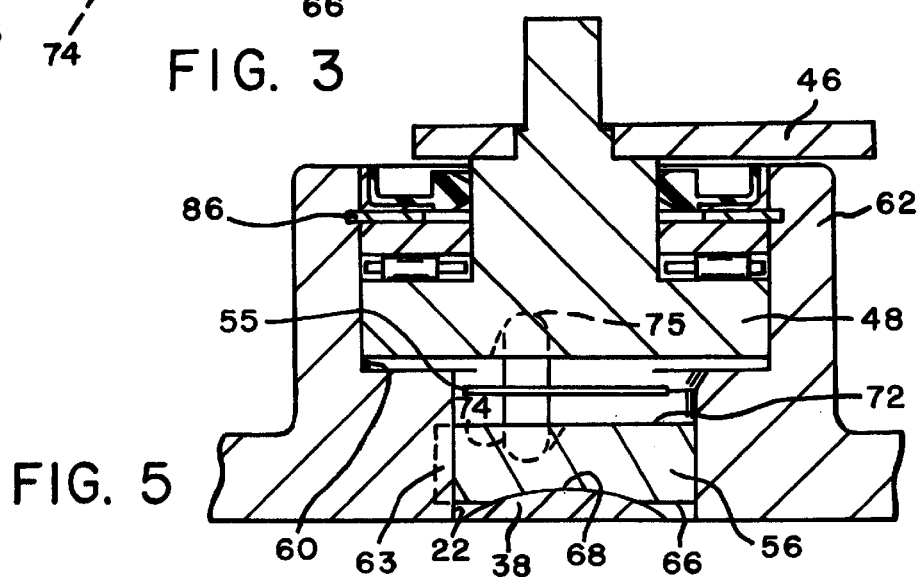
FIG. 5 is a of the actuator member of FIG. 1 in an actuated position.

With three connecting rods 50,52,54 a plane is established for the force transmission such that equal force can be applied to substantially eliminate any binding as the radial clearance between diameter 58 and bore 60 allows for some shifting within bore 60 such that the force that is transmitted to end plate 56 is uniformly applied to face 72. Thus, rotary motion is thereby translated into a desired axial input force which moves end plate 56 toward piston 38 to provide a clamping force which is communicated through piston 34 and bridge 24 to bring pads 28,30 into a desired engagement with rotor 12 to effect a brake application. When the input force is released from lever 46, end plate 48 is again rotated to the rest position as shown in FIG. 3. In the rest position, piston 38 acts on and axially moves end plate 56 toward retention stop or ring 86 such that connecting rods or toggles 50,53,54 are again aligned in planes which form a non-perpendicular angle with face 72 on end plate 56. The intensity of an actuation force to institute a parking brake application is only limited by the intensity of the force applied to lever 46.

I claim:

1. An actuator mechanism for a disc brake assembly having first and second pistons retained in a bore of a housing, said first and second pistons being responsive to pressurized fluid for moving first and second friction pads into engagement with a rotor and effect a brake application, said actuator mechanism being connected to said pistons for mechanically effecting a brake application without assistance from any pressurized fluid, said actuator mechanism being characterized by linkage means including first, second and third connecting rods for connecting a first end plate with a second end plate, said first end plate being located in said bore and keyed to said housing to prevent rotational movement of said first end plate, said first end plate being connected to one of said first and second pistons, said second end plate being positioned in a fixed axial location in said bore by a retention member, said first, second and third connecting rods each having a first end retained in a corresponding first indentation on a first face of said first end plate and a second end retained in a corresponding second indentation on a second face of said second end plate, said first end plate being urged toward said second end plate and said second end plate being rotated to a rest position whereby said first, second and third connecting rods are located in non perpendicular planes with respect to said first face on said first end plate and the axis of said bore, said second end plate responding to an input force by rotating about the axis of said bore and transmitting a variable translation movement to said first end plate as a function of said input force as said first, second and third connecting rods pivot with respect to the indentations on said first face and rotate to parallel planes with respect to said axis of said bore, said variable translation movement providing an operational force to position said first and second pistons and develop a clamping force sufficient to effect a desired braking application.

2. The actuator mechanism for a disc brake assembly as recited in claim 1 wherein said first and second indentations are in the form of truncated cones with spherical ends for receiving said first and second ends of said first, second and third connecting rods.

3. The actuator mechanism for a disc brake assembly as recited in claim 1 wherein a mechanical advantage provided by said connecting rods triples the clamping force capacity produced by said input force.

4. The actuator mechanism for a disc brake assembly as recited in claim 1 wherein said first and second ends on said three connecting rods each have spherical surfaces which rotate in corresponding truncated cones with spherical ends which define said first and second indentations in said first and second end plates.

5. The actuator mechanism for a disc brake assembly as recited in claim 1 wherein said variable translation movement of said first end plate is a non linear function of the rotary movement of said second end plate.

6. The actuator mechanism for a disc brake assembly as recited in claim 1 wherein a tolerance between said second end plate and bore provides for some relative radial movement to assure alignment of said connecting rods within said bore.

7. The actuator mechanism for a disc brake assembly as recited in claim 1 further including needle bearing means located between said second end plate and said retention member to reduce the loss of an input force required to establish a desired clamping force to effect a mechanical brake function.

* * * * *